United States Patent [19]

Polak et al.

[11] Patent Number: 5,339,122
[45] Date of Patent: Aug. 16, 1994

[54] OVERHEAD PROJECTOR WITH AUTOMATIC DOCUMENT POSITIONER

[75] Inventors: Donald J. Polak, Brentwood, Tenn.; Thomas J. Bush, Canton Center, Conn.

[73] Assignee: Pelikan, Inc., Franklin, Tenn.

[21] Appl. No.: 151,792

[22] Filed: Nov. 12, 1993

[51] Int. Cl.$^5$ ............................................. G03B 23/04
[52] U.S. Cl. ........................................ 353/103; 353/113; 353/DIG. 5
[58] Field of Search .................. 353/DIG. 5, DIG. 4, 353/DIG. 3, DIG. 1, 120, 103, 105, 113, 114, 115, 116, 118, 122

[56] References Cited

U.S. PATENT DOCUMENTS

| | | | |
|---|---|---|---|
| 3,110,217 | 11/1963 | Millner et al. | 353/DIG. 5 |
| 3,531,193 | 9/1970 | Diehl . | |
| 4,756,616 | 7/1988 | Min et al. | 353/DIG. 5 |
| 5,059,020 | 10/1991 | Géniéis | 353/DIG. 3 |
| 5,198,846 | 3/1993 | Zilber | 353/103 |

FOREIGN PATENT DOCUMENTS 0281225 12/1986 Japan .............................. 353/DIG. 5

Primary Examiner—William A. Cuchlinski, Jr.
Assistant Examiner—William C. Dowling
Attorney, Agent, or Firm—Cindrich & Titus

[57] ABSTRACT

An overhead projector for projecting images contained on media. The projector includes a housing having first and second image media storage cassettes and a platen which moves between those cassettes. A lifter is mounted between the cassettes for lifting the media from the first or second cassette onto the platen for projection. The lifter includes a lifting drive and a media gripping device. An image projector is movably mounted to the housing and positionable over the first or second cassette to project an image from media positioned on the platen to a view area. The projector includes a movable arm containing an illumination source, mirror and lens. Image media contained in a cassette can be sequenced from that cassette to the other by lifting onto the platen, from the cassette, projected and deposited in the other cassette either manually, remotely, automatically, or semiautomatically.

8 Claims, 4 Drawing Sheets

OVERHEAD PROJECTOR WITH AUTOMATIC DOCUMENT POSITIONER

FIELD OF INVENTION

The invention relates to an overhead projector having means for controllably positioning the film into and out of the plane of projection, and in particular, an overhead projector which is remotely operable.

BACKGROUND OF THE INVENTION

Overhead projectors used for projecting images from paper, books or other types of projectable images onto a viewing screen are generally well known. These devices include light means for illuminating the image to be projected and a lens and mirror for projecting the image onto the screen. In almost all cases, the image to be projected must be manually positioned on a projection platen. This is normally done by laying the image media on the platen prior to projection and removing it thereafter for positioning of another image media.

For many types of presentations, the presenter is remotely located from the projector which requires another person to present the media to the projector platen. This is often undesirable or inconvenient. No convenient method exists for presenting remotely or automatically a series of images to the projection platen for projection. Accordingly, it is an object of the present invention to provide a means for automatically or semiautomatically presenting media or the like images to a projection platen for projection. It is a further object of the invention to provide a means for reversing the media images projected. It is another object of the invention to provide an overhead projection means which can be remotely operated.

SUMMARY OF THE INVENTION

The present invention provides an overhead projector having means for moving viewable images into and out of the plane of projection either in a forward or reverse direction. Generally, the invention provides a housing having first and second cassettes for holding projectable image media, preferably flat media such as film, transparencies and the like which are most easily cyclable. A projection platen movable between cassettes is used as the projection plane and for transporting media from first to second or second to first cassettes- Lifting means are provided for lifting the media from its associated cassette into or off of the platen. Preferably, the lifting means includes in combination electromechanical or vacuum means for positioning vacuum or magnetic attachment means. Other types of attachment means such as mechanical fingers may be used attached to the media for lifting by the lifting means.

Projection means including a light source, mirror and lens mounted on a movable arm are provided, preferably between the two cassettes. The projection means is counterlevered over the projection plane located at the upper extent of the second cassette. By moving the arm and adjusting the mirror and lens the size and focus of the image can be changed. In addition to using the arm to focus the image, it is movable into a storage position which renders the entire projector very compact for transport ad storage.

In a preferred operation, the projector of the present invention is provided with a number of transparencies or other media containing images to be projected. These transparencies are stored within the first media holding or cassette means and the movable platen is initially positioned over the second media holding means.

To initiate the process, the lifting means lifts one edge of the first transparency above the plane of the platen and the platen moves over the first media cassette and under the lifted transparency. The transparency is released onto the platen which then reverses its position to the second cassette where the projection means is focused onto the transparency residing on the platen. The image is displayed on a viewing surface.

The next transparency is projected by activating the lifting mechanism to lift one edge of the first transparency off of the platen and one edge of the next transparency located in the first cassette. Both transparencies are lifted substantially simultaneously above the level of the upper surface of the platen and the platen commences movement towards the first cassette. As movement begins, the trailing edge of the first transparency slides into the second cassette and the leading edge of the next transparency is positioned over the leading edge of the platen. When the platen has completed its positioning over the first cassette, the lifting means releases both transparencies so that the first transparency resides in the second cassette and the next transparency resides on the platen.

The platen is then reversed and moved over the second cassette and into the projectors plane of projection for projection.

The foregoing operation is repeated until all of the transparencies in the first cassette have been cycled through the projection plane. At any point, the operation can be stopped or reversed. The controls for the system can be automatic, semiautomatic or manual. In a preferred embodiment, the controls provide programmable logic to meet the needs of an operator. The projection of the present invention provides significant advantages over manual projections. However, other advantages of the invention will become apparent from a perusal of the following detailed description of a presently preferred embodiment taken in connection with the accompanying drawing.

PRESENTLY PREFERRED EMBODIMENTS

Figure 1:
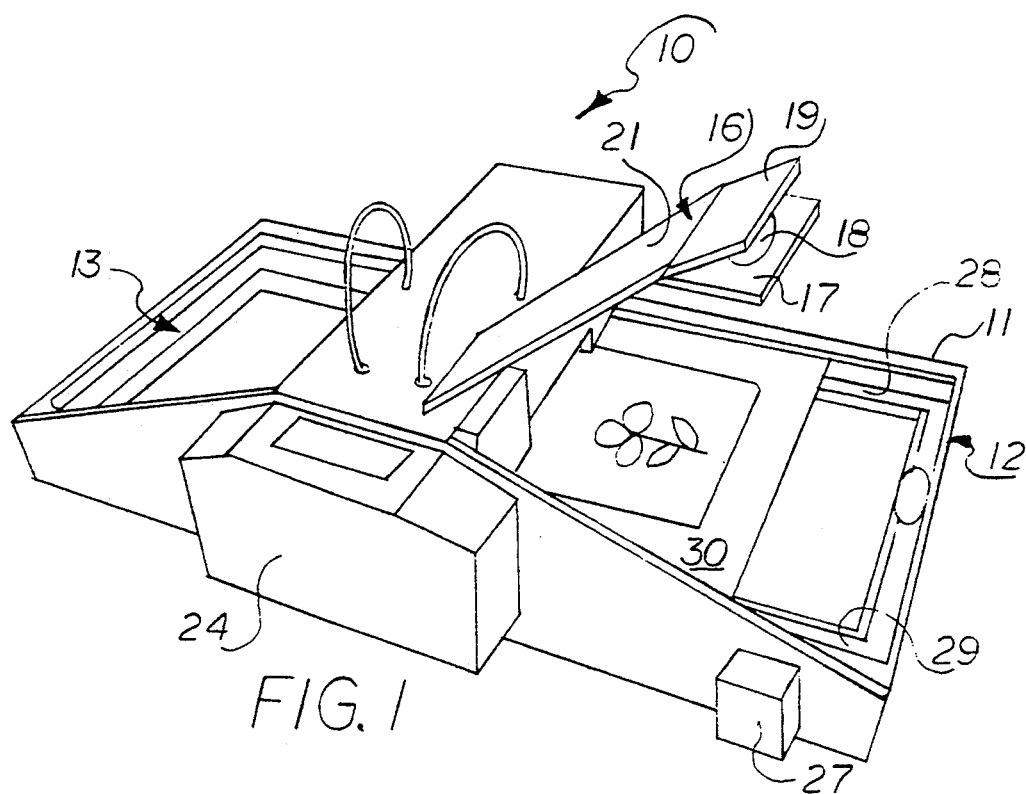
FIGS. 1 and 2 are perspective views of the projector of the present invention.
Figure 2:
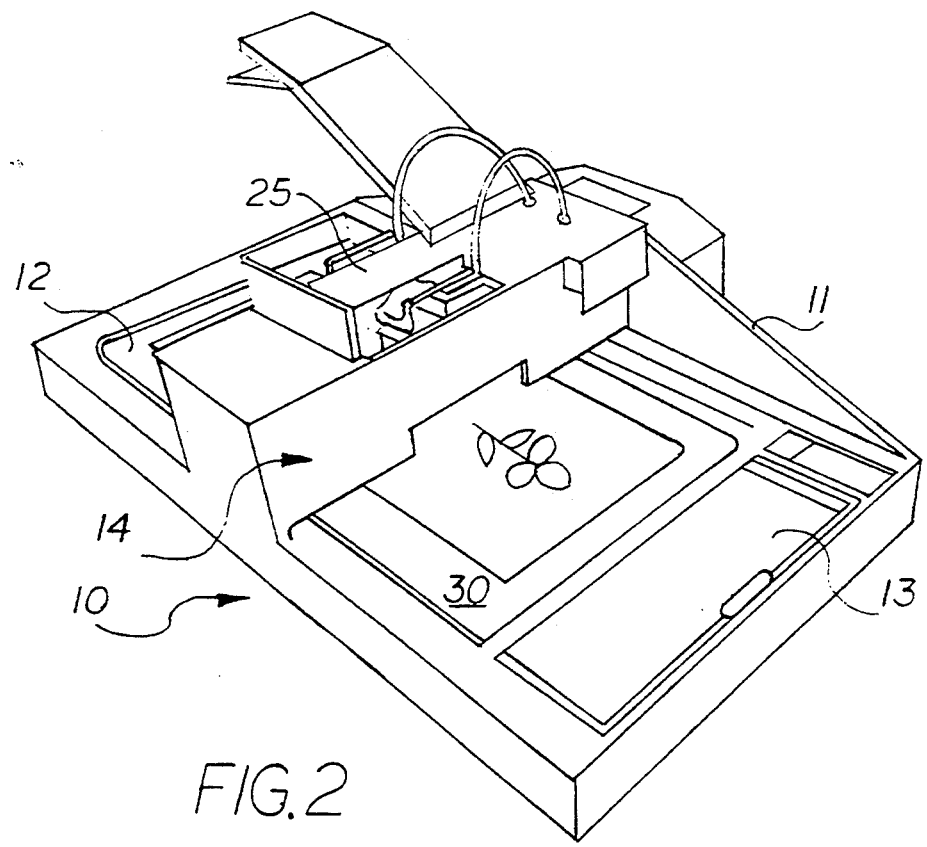

Referring to FIGS. 1 and 2, a presently preferred embodiment of the overhead projector 10 of the present invention is shown. Projector 10 includes a housing 11 having integral first and second media holding means or cassettes 12 and 13, respectively. Cassettes 12 and 13 can be dimensioned to hold various sized media such transparencies, films and the like and may include inserts to properly position the media for accurate alignment with the lifting means described hereinbelow.

Also the cassettes can include an adjustment means to conform to the dimensions of the media to be projected.

Mousing 11 preferably includes a support member 14 bridging the width of the housing 17 between first and second cassettes 12 and 13. Support member 14 is positioned above and between cassettes 12 and 13 to support image projector 16. Image projector 16 includes a light source 17 projecting lens 18 and mirror 19. Image projector 16 includes movable arm 21 which may be raised or lowered for proper focusing and for storage when not in use.

Support member 14 also includes media lifting means 25 and its associated equipment. In a preferred embodiment, lifting means 25 includes vacuum attachments requiring air pump 23 which is mounted on support member 14.

Mounted to housing 11 is control box 24, platen drive motor 26 and motor housing 27. While shown mounted to the side housing 11, motor housing 27 can be mounted in any other convenient location within or without the housing. Control box 24 includes associated electrical control for controlling platen motor 26, the operation of lifting means 25 and projection means 16. Extending the internal length of housing 11 are platen track 28 and 29 which are used to slidably support movable platen 30.

Platen 30 preferably includes a mirrored surface for supporting media to be projected and includes roller bearings 31 on the lower surface located and designed to engage tracks 28 and 29 to guidingly facilitate movement of platen 30. Platen 30 is operably connected to drive belt or cable 32 which is driven in the forward and reverse directions by motor 26 through drive sprocket or pully 33. Platen 30 is movable between the second and first operating positions located over first and second cassettes 12 and 13, respectively.

In its first operating position, platen 20 is positioned over second cassette 13. In a preferred embodiment, platen 20 comprises the plane of projection for projection of the image media supported therein.

Figure 4:
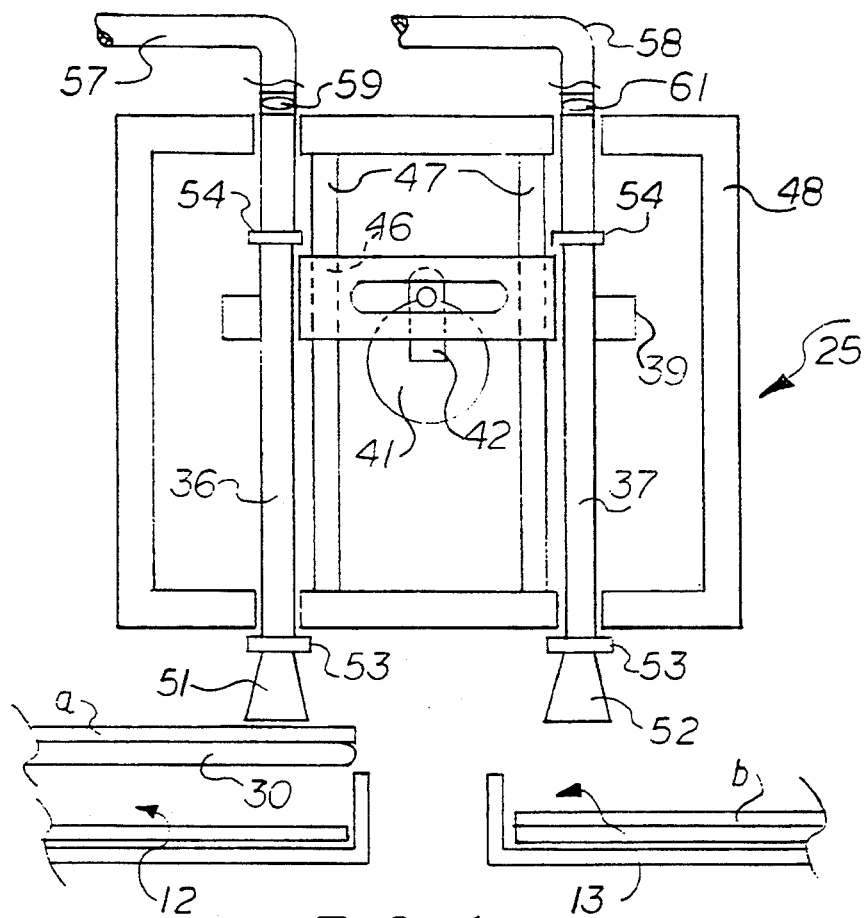
FIGS. 4–6 are diagrammatic views of the lifting means illustrating various lifting positions of viewing media.
Figure 3:
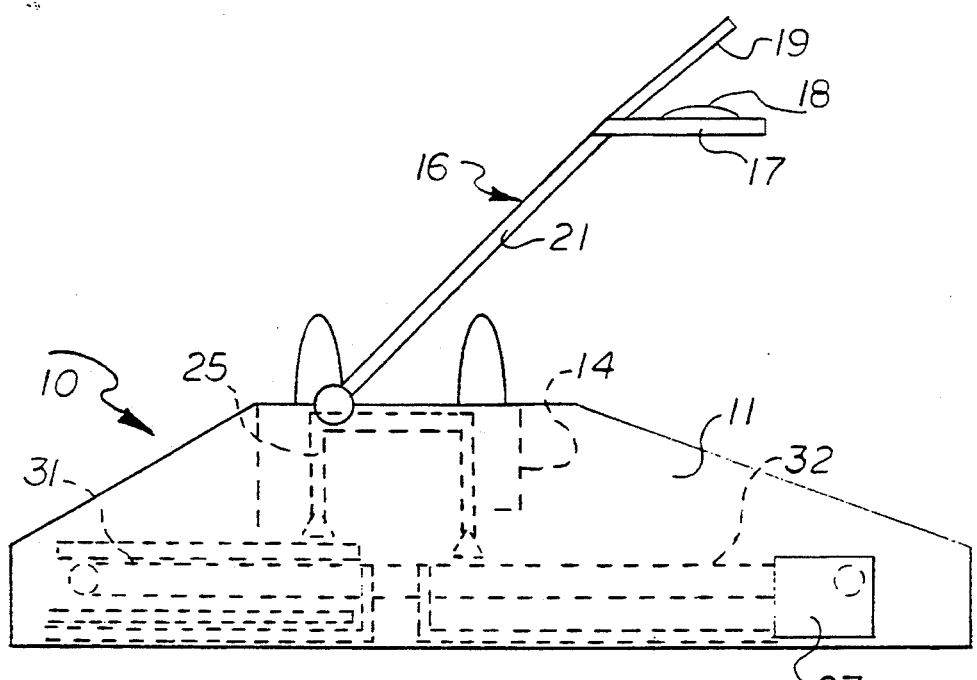
FIG. 3 is a side elevation of the projector shown in FIG. 1.
Figure 5:
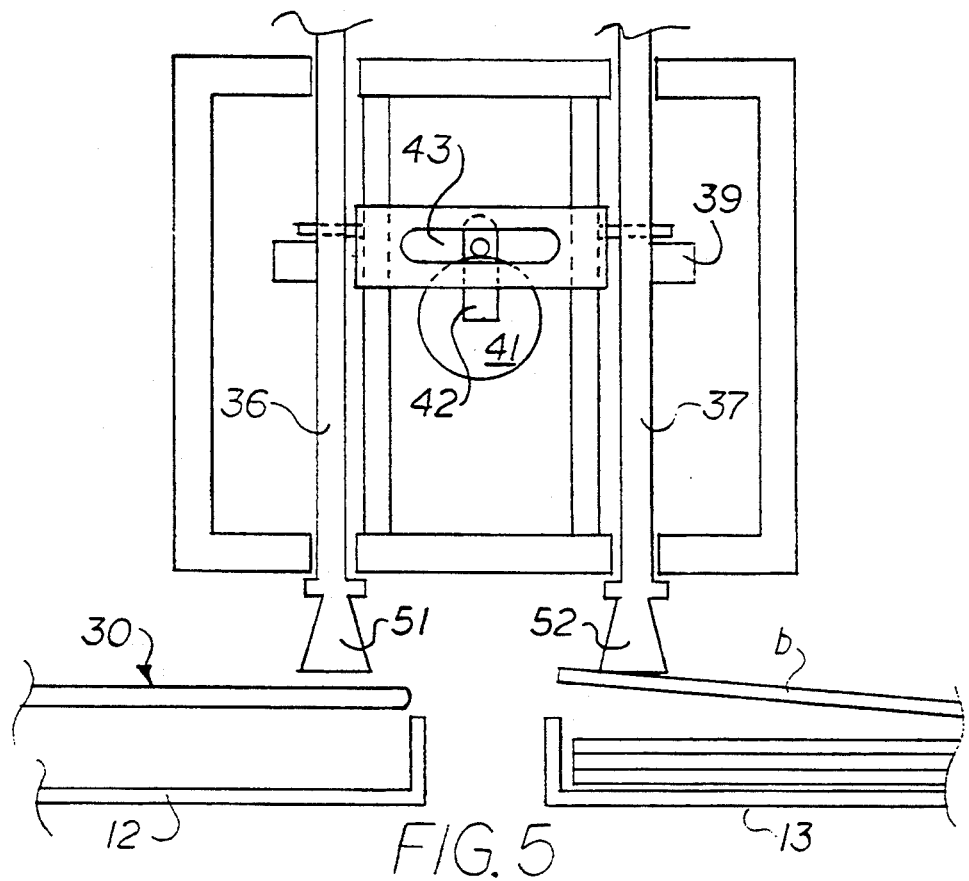
Figure 6:
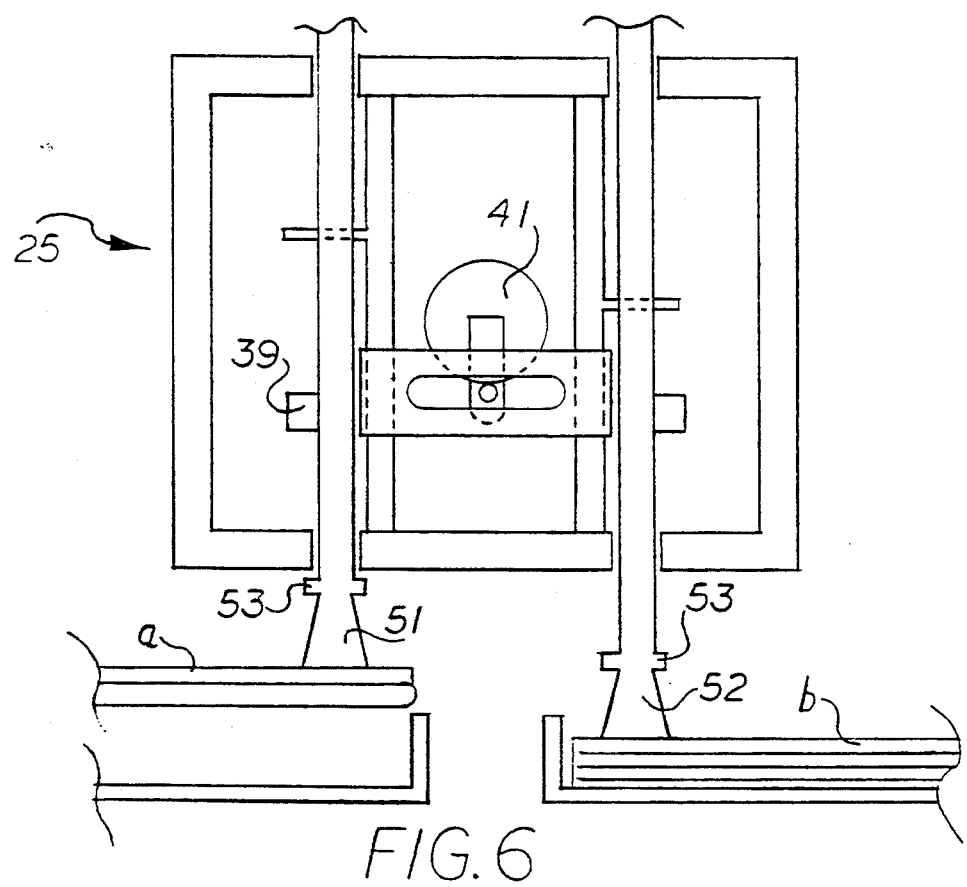
Figure 7:
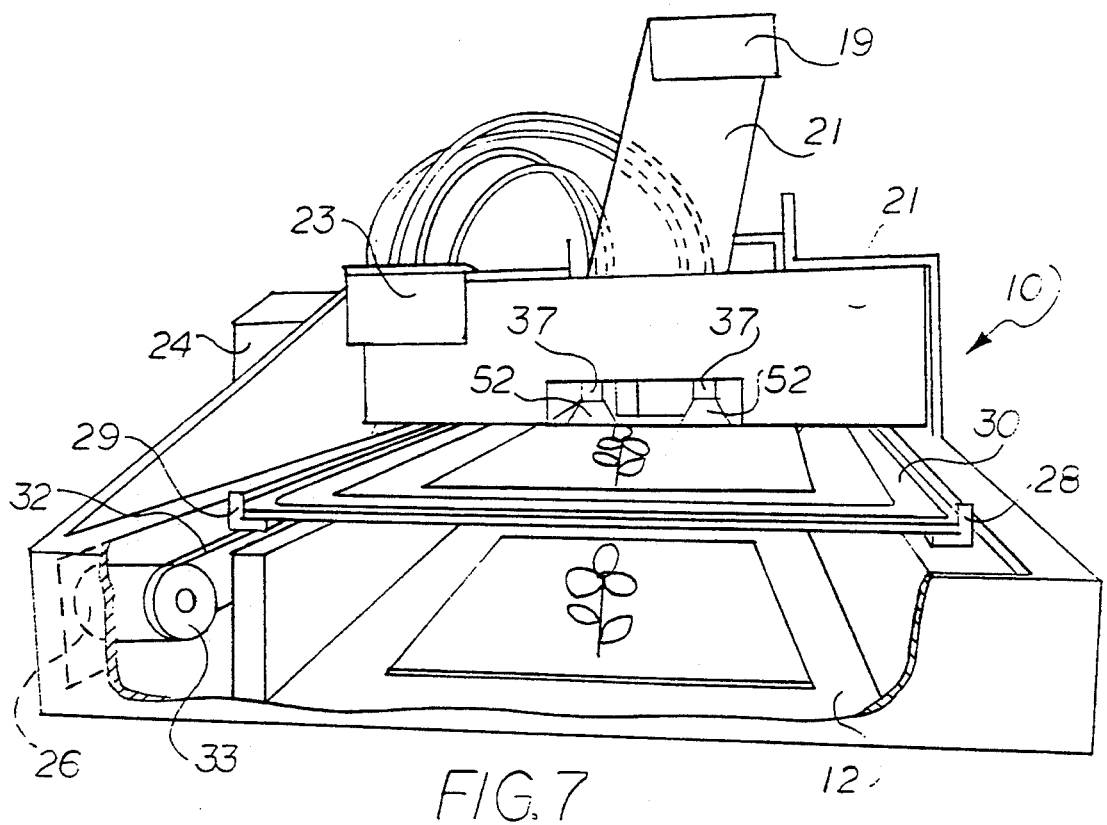
FIG. 7 is an end perspective view having a cut-away portion.
Figure 8:
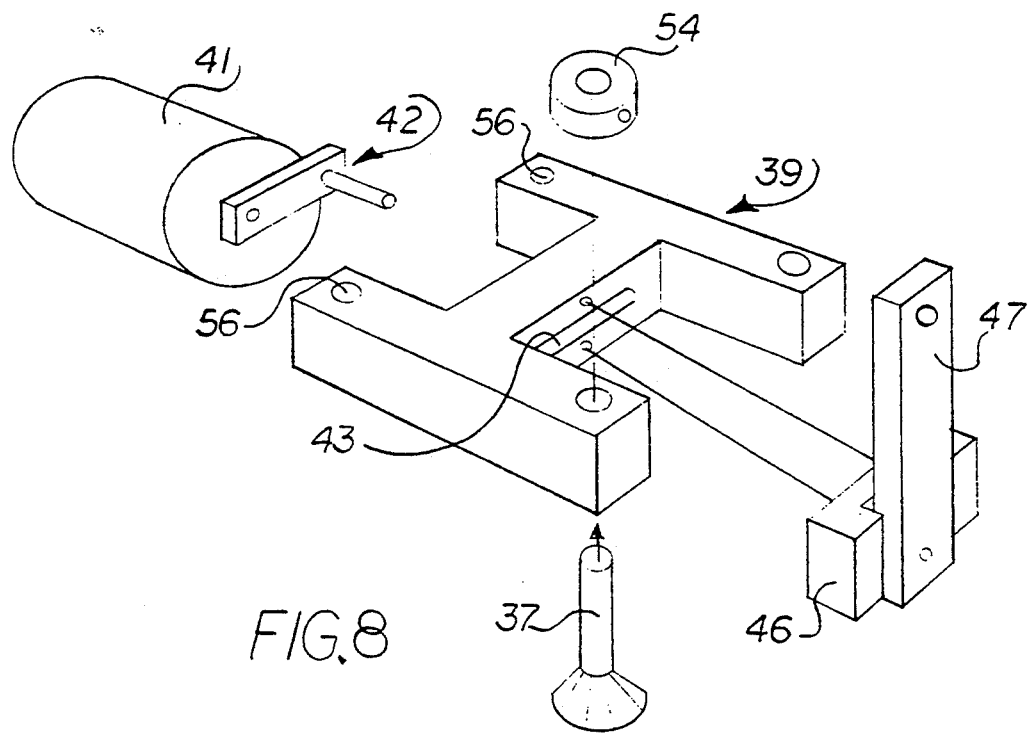
FIG. 8 is an exploded perspective view of the subassembly for the lifting means.

Referring to FIGS. 4–6, a diagrammatic representation of one preferred lifting means 25 is shown in which at least one set of first and second lifter tubes 36 and 37, respectively, are retractably provided. Lifters 36 and 37 are frictionally slidably mounted on lifting frame 39. Lifting frame 39 is connected to a drive means 41 such as an electric motor by means of drive and pin rod 42 which rides in slot 43. As drive means 41 and rod 42 rotate and ride, and lifting frame 39 moves up and down a linear guide 46 rides on vertical rails 47 (See FIG. 8). Rails 48 are mounted in support frame 48 which is mounted to support 14. In the preferred embodiment, lifting means 25 comprise at least two sets of lifter tubes 36 and 37.

In a preferred embodiment of the invention, lifter tubes 36 and 37 includes transfer cups 51 and 52, respectively, on the distal ends of the tube. Transfer cups 51 and 52 are preferably made from a resilient or pliable silicone rubber such that upon contact with image media a seal or partial vacuum seal is formed. Alternatively, transfer cups 51 and 52 can comprise electromagnetics for magnetically picking up an image media having magnetizable inserts in or on its frame. Positioned approximately midway up lifting tubes 36 and 37 from transfer cups 51 and 52 are included first and second collar 54 which prevent the tubes from dropping out of openings 54 in which they engagingly slide. Also, stops 53 are provided adjacent transfer cups 51 and 52. The respective other end of each tube 36 and 37 is connected to an air or vacuum pump 23 through associated vacuum line 57 and 58. At the respective connection of the associated lifting tube and vacuum line is preferably positioned a check valve 59 and 61, respectively. Pump 23 is used to create a vacuum or partial vacuum at the interface between transfer cups 51 and 52 and the image media when the associated lifters are positioned on the media.

Referring to FIGS. 4–6, various operative positions are shown for purposes of illustration. In FIG. 4, for example, platen 30 is shown positioned under a transparency from first cassette 12. First and second lifting tubes 36 and 37 are in the their fully retracted position with no vacuum at transfer cup 51 or 52. Referring to FIG. 5, on the other hand, second lifting tube 37 has engaged transparency b from second cassette 13 to await movement of platen 30 to second cassette 13 and position itself thereunder. In this specific example, transparency b is lifted for positioning on the platen for reversing the projection process.

In FIG. 6, first and second lifter tubes are fully extended by drive means 41 to extend rod 42 downwardly so that lifting frame 39 is at its covert extent- During this operation, from FIG. 5 to FIG. 6, drive rod 42 has rotated 180 degrees and the associated rod pin has traversed one half of slot 43 to lower lifting frame 39 from its highest to covert position. First and second sets of transfer cups 51 and 52 contact transparencies a and b residing in first and second cassettes 12 and 13, respectively. A vacuum is created by pump 23 at the media/transfer cup interface so that when lifting frame 39 is lifted by the rotation of motor 41 and drive rod pin 42, the lifter tubes are moved upwardly and transparencies a and b are lifted above the surface plane of platen 30. As the platen is then moved to the right, transparency a's unsupported edge drops into first cassette 12 and the unsupported edge of transparency b is lifted. By terminating the vacuum, transparency a is dropped into cassette 12 and transparency b is positioned on platen 30 for projection.

These examples are illustrations of the operation necessary to lift and transport the image media from one cassette to the other. Media from a source cassette can be cycled completely through projector 10 without manually having to place them on the projector plane. The transparencies may also be reversed.

Furthermore, while at least one pair of tubes is shown, it is desirable to have at least two pairs of such lifting tubes to provide support across the edge of the transparency. Additionally, while vacuum lifting means are preferred because they accommodate all types of media, magnetic and mechanical means may also be used.

Electrical control means within the slide of the art can be employed to control the operation of projector 10. These means can include limit switches to automatically control or limit the operation of platen 30 and lifting frame 39. Remote control units connected to the unit through wires or infrared light can also be used.

While presently preferred embodiments of the invention have been shown and described in detail, the invention may be otherwise embodied within the scope of the appended claims.

What is claimed is:

1. An overhead projector for projecting images contained on media comprising:
    (a) a housing having first and second media holders, (b) a platen movable between said first and second media holder, (c) a lifter for lifting media to and from said first or second holder onto or off of said platen, (d) an image projector for projecting an image on said media positioned on said platen, (e) a drive for moving said platen between said first and second media holders, and (f) selectable electrical controls for controlling said drive, lifter and image projector in preselected or random sequence.

2. An overhead projector as set forth in claim 1 wherein said lifter comprises a rigid support mounted between said first and second media holder; a lift drive mounted to said support, and to a lift frame movably mounted to said support and operably connected said lift motor.

3. An overhead projector as set forth in claim 1 or 2 wherein said lifter includes vacuum means for lifting said image media.

4. An overhead projector as set forth in claim 1 or 2 wherein said lifter includes magnetic means for lifting said image media.

5. An overhead projector as set forth in claim 1 or 2 wherein said image projector comprises an arm mounted to said housing and having a means for illuminating and focusing an image on said media onto a viewing plane.

6. An overhead projector as set forth in claim 1 or 2 wherein said image projector comprises a movable arm mounted at one end between said first and second media holder, said arm having at its other end an adjustable illumination and focusing means for focusing an image on said media onto a viewing plane.

7. An overhead projector as set forth in claim 1 or 2 wherein said platen includes a track extending between said first and second holders on which said platen rides and roller guides positioned between the track and platen.

8. An overhead projector as set forth in claim 1 or 2 where said selectable electrical control is remotely located from the projector.

* * * * *